United States Patent
Komeichi et al.

(10) Patent No.: US 10,634,791 B2
(45) Date of Patent: Apr. 28, 2020

(54) LASER SCANNER SYSTEM AND REGISTRATION METHOD OF POINT CLOUD DATA

(71) Applicant: TOPCON Corporation, Tokyo-to (JP)

(72) Inventors: Takahiro Komeichi, Tokyo-to (JP); Ken-ichiro Yoshino, Tokyo-to (JP); Tadayuki Ito, Tokyo-to (JP)

(73) Assignee: TOPCON Corporation, Tokyo-to (JP)

( * ) Notice: Subject to any disclaimer, the term of this patent is extended or adjusted under 35 U.S.C. 154(b) by 364 days.

(21) Appl. No.: 15/635,566

(22) Filed: Jun. 28, 2017

(65) Prior Publication Data
US 2018/0003825 A1 Jan. 4, 2018

(30) Foreign Application Priority Data
Jun. 30, 2016 (JP) .................... 2016-130754

(51) Int. Cl.
*G01S 17/89* (2020.01)
*G01S 17/42* (2006.01)
(Continued)

(52) U.S. Cl.
CPC ............ *G01S 17/89* (2013.01); *G01S 7/4817* (2013.01); *G01S 17/42* (2013.01); *G01S 17/86* (2020.01); *G01S 17/87* (2013.01); *G01S 19/14* (2013.01)

(58) Field of Classification Search
CPC ...... G01S 17/89; G01S 17/023; G01S 7/4817; G01S 17/42; G01S 17/87; G01S 19/14
See application file for complete search history.

(56) References Cited

U.S. PATENT DOCUMENTS

RE41,175 E    3/2010  Vashisth et al.
9,041,915 B2* 5/2015  Earhart ................. G01S 7/4813
                                                   356/4.01
(Continued)

FOREIGN PATENT DOCUMENTS

JP     5073256 B2      11/2012
JP   2013-190272 A      9/2013

OTHER PUBLICATIONS

European communication dated Nov. 14, 2017 in corresponding European patent application No. 17178624.7.

*Primary Examiner* — Mohammad K Islam
(74) *Attorney, Agent, or Firm* — Nields, Lemack & Frame, LLC

(57) ABSTRACT

The invention provides a laser scanner system, which comprises a laser scanner which includes a distance measuring unit for emitting a distance measuring light, receiving a reflected light, and performing a distance measurement, a scanning unit for rotatably irradiating the distance measuring light, a directional angle detecting unit for detecting an irradiating direction of the distance measuring light, a GNSS device and a control arithmetic unit, and a target which sets a back sight point, wherein the control arithmetic unit has a target scanning mode and a point cloud data measurement mode, and is configured to calculate point cloud data with a global coordinate value and a global coordinate value of the target based on the global coordinate value obtained by the GNSS device, a measurement result obtained by executing the point cloud data measurement mode and a measurement result obtained by executing the target scanning mode.

5 Claims, 4 Drawing Sheets

(51) Int. Cl.
    *G01S 17/87*    (2020.01)
    *G01S 19/14*    (2010.01)
    *G01S 7/481*    (2006.01)
    *G01S 17/86*    (2020.01)

(56) References Cited

U.S. PATENT DOCUMENTS

| | | | |
|---|---|---|---|
| 9,163,922 B2* | 10/2015 | Bridges | G01B 5/008 |
| 9,661,470 B1* | 5/2017 | Du Bois | G01S 5/00 |
| 10,131,446 B1* | 11/2018 | Stambler | G01S 17/89 |
| 2005/0190384 A1* | 9/2005 | Persi | G06T 7/33 |
| | | | 358/1.8 |
| 2008/0075325 A1 | 3/2008 | Otani et al. | |
| 2009/0220145 A1 | 9/2009 | Ootani et al. | |
| 2010/0256940 A1* | 10/2010 | Ogawa | G01S 7/4812 |
| | | | 702/97 |
| 2013/0176305 A1 | 7/2013 | Ito et al. | |
| 2014/0009604 A1* | 1/2014 | Hinderling | G01C 15/002 |
| | | | 348/142 |
| 2014/0233010 A1* | 8/2014 | Baldwin | G01C 21/30 |
| | | | 356/4.01 |
| 2014/0240690 A1* | 8/2014 | Newman | G01S 7/4808 |
| | | | 356/4.01 |
| 2014/0300886 A1 | 10/2014 | Zogg et al. | |
| 2015/0042645 A1* | 2/2015 | Kawaguchi | G01S 7/4808 |
| | | | 345/419 |
| 2015/0153454 A1* | 6/2015 | Al-Hader | G01S 17/89 |
| | | | 356/4.01 |
| 2015/0323655 A1* | 11/2015 | Al-Hader | G01C 15/002 |
| | | | 356/5.01 |
| 2015/0323672 A1* | 11/2015 | Shenkar | G01C 15/002 |
| | | | 382/154 |
| 2015/0331111 A1* | 11/2015 | Newman | G01S 17/875 |
| | | | 356/4.01 |
| 2016/0070981 A1* | 3/2016 | Sasaki | G06K 9/6202 |
| | | | 348/148 |
| 2016/0138919 A1* | 5/2016 | Green | G06T 17/00 |
| | | | 348/135 |
| 2016/0188977 A1* | 6/2016 | Kearns | G06K 9/00664 |
| | | | 348/113 |
| 2016/0327383 A1* | 11/2016 | Becker | G01B 11/005 |
| 2017/0016870 A1* | 1/2017 | McPeek | G01N 33/025 |
| 2017/0123066 A1* | 5/2017 | Coddington | G01S 17/86 |
| 2018/0075643 A1* | 3/2018 | Sequeira | G01C 21/206 |
| 2019/0009472 A1* | 1/2019 | Mark | B33Y 30/00 |
| 2019/0018143 A1* | 1/2019 | Thayer | G01S 7/484 |
| 2019/0162855 A1* | 5/2019 | McPeek | G01S 17/86 |

* cited by examiner

LASER SCANNER SYSTEM AND REGISTRATION METHOD OF POINT CLOUD DATA

BACKGROUND OF THE INVENTION

The present invention relates to a laser scanner system which acquires point cloud data, acquires the point cloud data from a plurality of points by the laser scanner and integrates a plurality of point cloud data as point cloud data of the same coordinate system and a registration method of the point cloud data.

As a measuring instrument for acquiring three-dimensional data of an object to be measured, a laser scanner is used. The laser scanner scans a distance measuring light and acquires point cloud data of an object to be measured or a range to be measured. Based on the point cloud data as acquired, a shape and the three-dimensional data of the object to be measured can be determined.

Further, in a case where the object to be measured is a structure such as a building or the like, if a measurement is performed from one direction, point cloud data of a shaded portion cannot be acquired. For this reason, the point cloud data of the object to be measured are acquired from a plurality of points.

In a case where the point cloud data are acquired from the plurality of points, the point cloud data needs to be combined so as to become data of the same coordinate system.

Conventionally, in order to combine the point cloud data acquired from a plurality of installation points, a machine reference points at each installation point (an installation point of a laser scanner), an instrument height and a plurality of back sight points with known coordinate values are required.

Although the machine reference point may be arbitrary, the plurality of back sight points are measured from the machine reference points, and the machine reference point is determined as a known point based on a measurement result. Further, the instrument height is a height from a ground surface of the installation point to a reference point of the laser scanner and is actually measured in an installed state.

The plurality of point cloud data are combined based on a coordinate value of each machine reference point, an instrument height and a coordinate value of common back sight points.

As described above, in a conventional laser scanner system, a plurality of known back sight points, the instrument height and the machine reference point must be measured every time the laser scanner is installed. For this reason, there is a problem of a complicated workability.

SUMMARY OF THE INVENTION

It is an object of the present invention to provide a laser scanner, a laser scanner system and a registration method of point cloud data which facilitates an installation operation of a laser scanner or facilitates a combination of a plurality of point cloud data in a case where the point group data are acquired from a plurality of points.

To attain the object as described above, a laser scanner system according to the present invention comprises a laser scanner which includes a distance measuring unit for emitting a distance measuring light, receiving a reflected light from an object to be measured, and performing a distance measurement, a scanning unit for rotatably irradiating the distance measuring light, a directional angle detecting unit for detecting an irradiating direction of the distance measuring light, a GNSS device and a control arithmetic unit, and a target which sets a back sight point, wherein the control arithmetic unit has a target scanning mode in which a target scanning is performed over a range including the target and a point cloud data measurement mode in which the distance measuring light is scanned to a measurement range and point cloud data is acquired, and is configured to calculate point cloud data with a global coordinate value and a global coordinate value of the target based on the global coordinate value obtained by the GNSS device, a measurement result obtained by executing the point cloud data measurement mode and a measurement result obtained by executing the target scanning mode.

Further, the laser scanner system according to the present invention further comprises a data processing device, wherein the control arithmetic unit is configured to obtain global coordinate values of an installation position of the laser scanner from the GNSS device at a plurality of installation points of the laser scanner respectively, determine a target central position by executing the target scanning mode, and acquire point cloud data by executing the point cloud data measurement mode, and wherein the data processing device is configured to perform a shape matching of the plurality of point cloud data and combine the plurality of point cloud data with each other based on the global coordinate values at the plurality of installation points, the target central positions from the plurality of installation points, and the point cloud data from the plurality of installation points.

Further, in the laser scanner system according to the present invention, the data processing device is provided on the control arithmetic unit.

Further, in the laser scanner system according to the present invention, the data processing device is provided separately from the laser scanner.

Furthermore, a registration method of point cloud data according to the present invention comprises a step of installing a laser scanner having a GNSS device at an arbitrary installation position, a step of installing a target at an arbitrary position, a step of obtaining global coordinate values of the laser scanner at a plurality of points by the GNSS device, a step of determining a central position of the target by performing a target scanning by the laser scanner from each installation position and obtaining a global coordinate value of a center of the target based on the global coordinate values of the laser scanner at the plurality of points, a step of acquiring point cloud data from the plurality of points and a step of performing a shape matching of the plurality of point cloud data by giving the global coordinate value of the center of the target as an initial value and combining the plurality of point cloud data.

According to the present invention, the laser scanner system comprises a laser scanner which includes a distance measuring unit for emitting a distance measuring light, receiving a reflected light from an object to be measured, and performing a distance measurement, a scanning unit for rotatably irradiating the distance measuring light, a directional angle detecting unit for detecting an irradiating direction of the distance measuring light, a GNSS device and a control arithmetic unit, and a target which sets a back sight point, wherein the control arithmetic unit has a target scanning mode in which a target scanning is performed over a range including the target and a point cloud data measurement mode in which the distance measuring light is scanned to a measurement range and point cloud data is acquired, and is configured to calculate point cloud data with a global coordinate value and a global coordinate value of the target based on the global coordinate value obtained by the GNSS device, a measurement result obtained by executing the point cloud data measurement mode and a measurement result obtained by executing the target scanning mode. As a result, the laser scanner can be installed at an arbitrary position according to a working environment, a measurement work of an instrument height of the laser scanner or the like can be omitted, the measurement work can be efficiently performed, and the point cloud data as acquired can be easily converted into the global coordinate value.

Further, according to the present invention, the laser scanner system further comprises a data processing device, wherein the control arithmetic unit is configured to obtain global coordinate values of an installation position of the laser scanner from the GNSS device at a plurality of installation points of the laser scanner respectively, determine a target central position by executing the target scanning mode, and acquire point cloud data by executing the point cloud data measurement mode, and wherein the data processing device is configured to perform a shape matching of the plurality of point cloud data and combine the plurality of point cloud data with each other based on the global coordinate values at the plurality of installation points, the target central positions from the plurality of installation points, and the point cloud data from the plurality of installation points. As a result, the installation position of the laser scanner and an installation position of the target can be easily set according to the working environment, the measurement work of the instrument height of the laser scanner or the like can be omitted, and a workability can be improved.

Furthermore, according to the present invention, the registration method of the point cloud data comprises a step of installing a laser scanner having a GNSS device at an arbitrary installation position, a step of installing a target at an arbitrary position, a step of obtaining global coordinate values of the laser scanner at a plurality of points by the GNSS device, a step of determining a central position of the target by performing a target scanning by the laser scanner from each installation position and obtaining a global coordinate value of a center of the target based on the global coordinate values of the laser scanner at the plurality of points, a step of acquiring point cloud data from the plurality of points and a step of performing a shape matching of the plurality of point cloud data by giving the global coordinate value of the center of the target as an initial value and combining the plurality of point cloud data. As a result, the installation position of the laser scanner and the installation position of the target can be easily set according to a working environment, the measurement work of the instrument height of the laser scanner or the like can be omitted, and the workability can be improved.

DETAILED DESCRIPTION OF THE PREFERRED EMBODIMENT

A description will be given below on an embodiment of the present invention by referring to the attached drawings.

First, referring to FIG. 1 and FIG. 2, a description will be given on a three-dimensional laser scanner used in the present embodiment.

Figure 1:
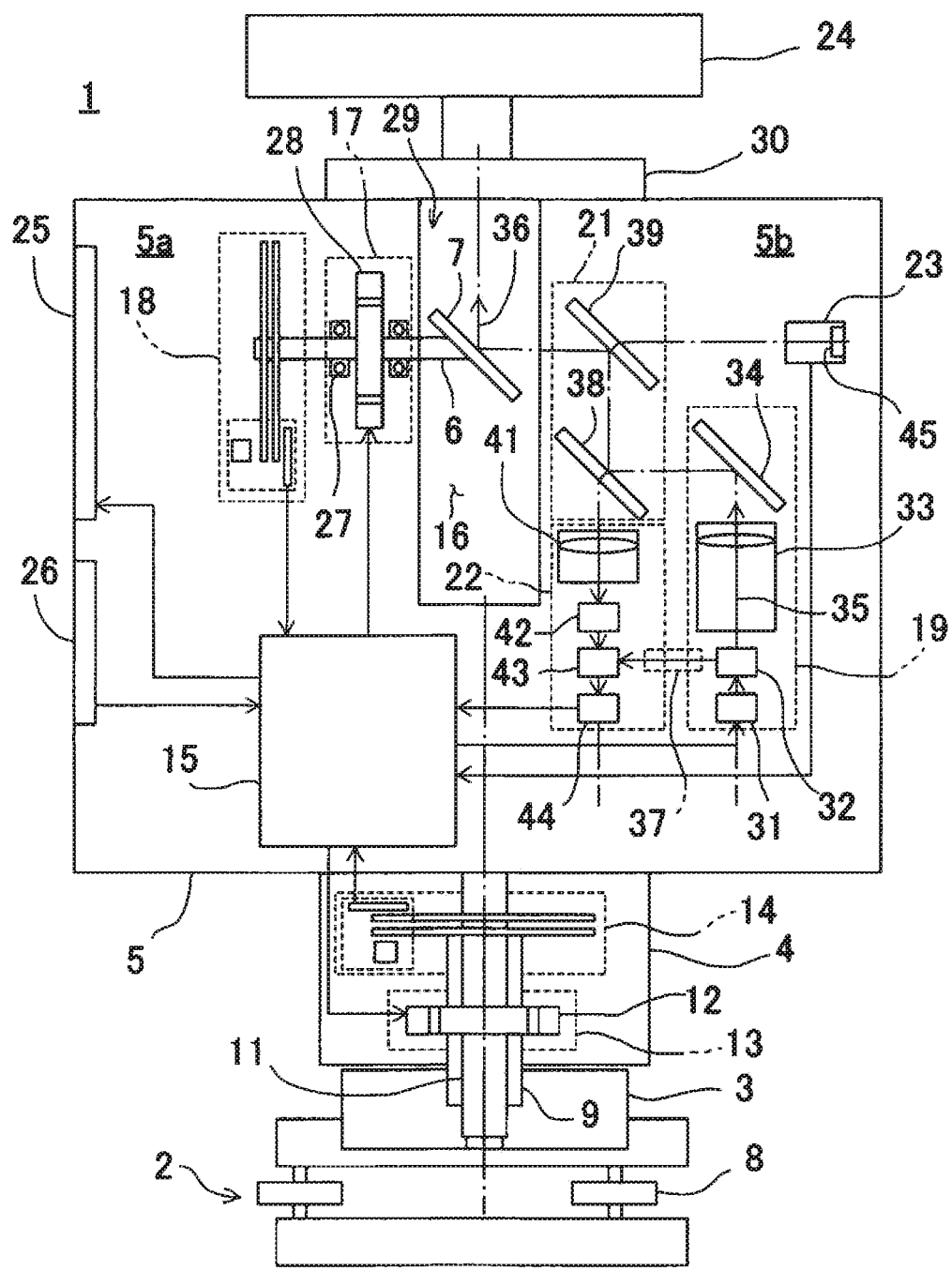
FIG. 1 is a schematic sectional elevational view of a three-dimensional laser scanner used in an embodiment of the present invention.
Figure 2:
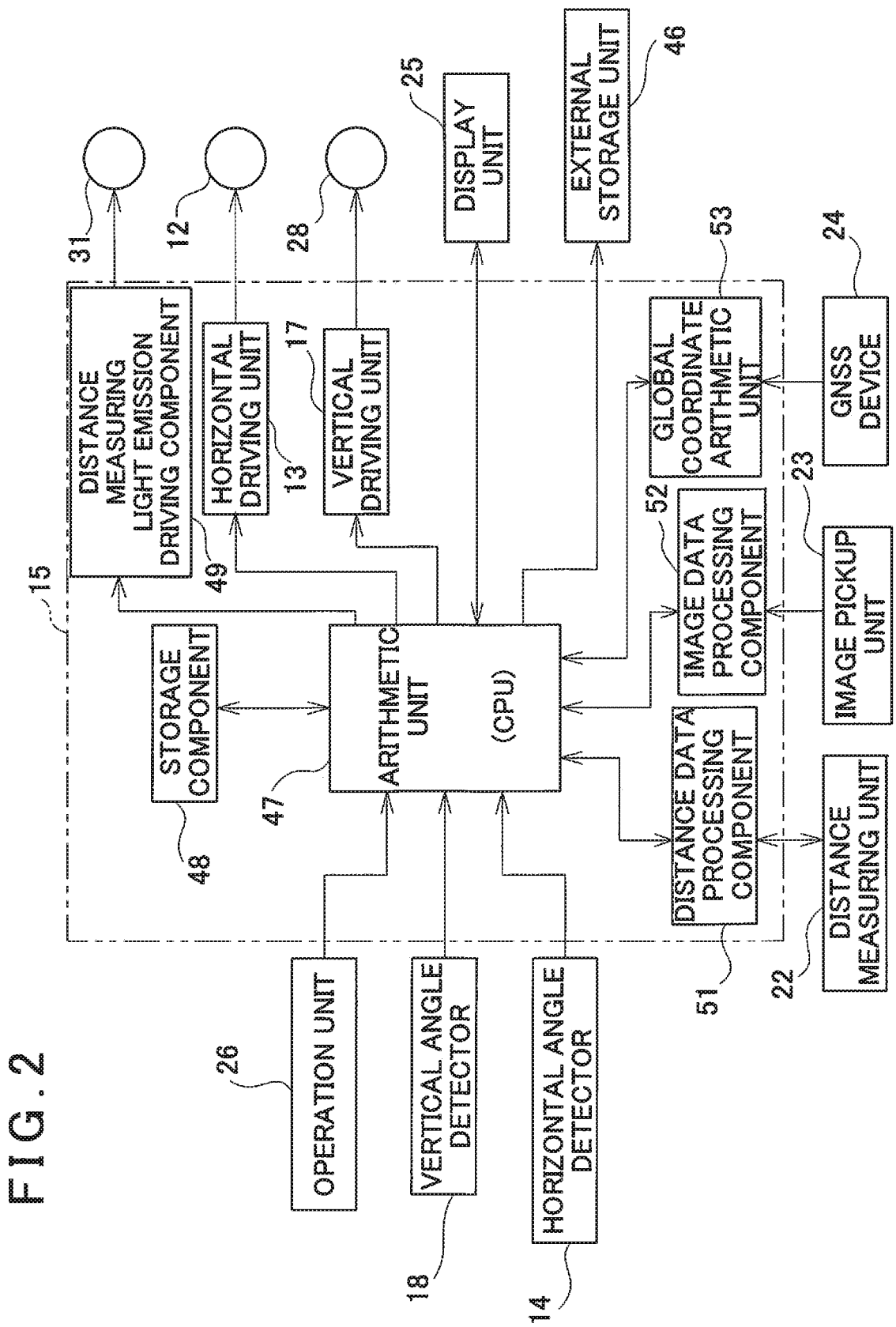
FIG. 2 is a block diagram to show an arrangement of the laser scanner.
Figure 3:
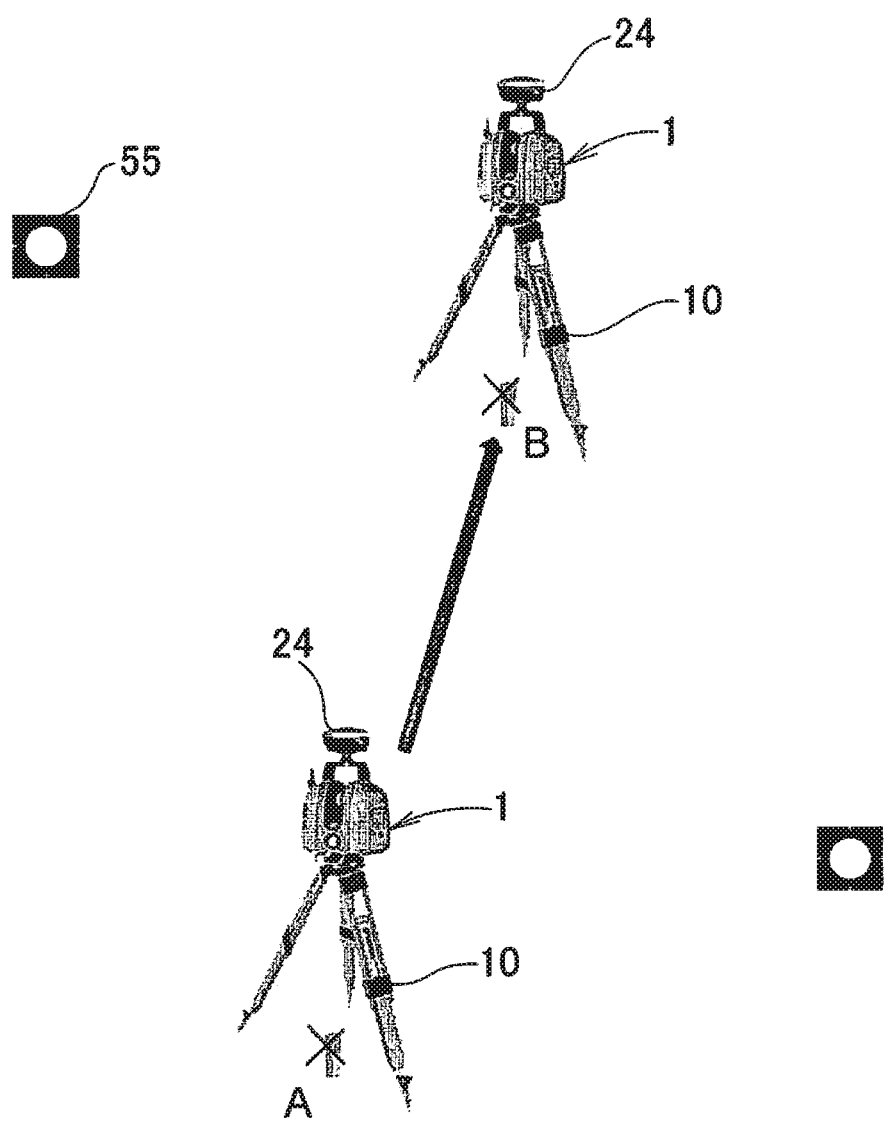
FIG. 3 is a schematical view of a system according to the embodiment of the present invention.

As shown in FIG. 1, a laser scanner 1 is installed via a tripod 10 (see FIG. 3). The laser scanner 1 comprises a leveling unit 2 attached on the tripod 10, a base unit 3 provided on the leveling unit 2, a frame unit 5 provided on the base unit 3 via a horizontal rotary unit 4 so as to be rotatable in a horizontal direction and a scanning mirror 7 provided on the frame unit 5 so as to be rotatable around a vertical rotation shaft 6 as a center in a vertical direction (an elevation direction).

The leveling unit 2 has, e.g., one supporting pin (not shown) and two adjusting screws 8. When the adjusting screws 8 are adjusted so that a tilt sensor (not shown) provided on the frame unit 5 detects a horizontality, a leveling of the leveling unit 2 is performed.

The horizontal rotary unit 4 has a horizontal rotation shaft 11 which is rotatably and vertically supported on the base unit 3 via a bearing 9. The frame unit 5 is supported by the horizontal rotation shaft 11, and the frame unit 5 is configured to rotate together with the horizontal rotation shaft 11.

The horizontal rotary unit 4 accommodates a horizontal driving unit 13 which includes a horizontal drive motor 12, and a horizontal angle detector (e.g., an encoder) 14 which detects a rotation angle of the horizontal rotation shaft 11. The frame unit 5 is rotated around the horizontal rotation shaft 11 as the center by the horizontal drive motor 12. It is so designed that a rotation angle of the horizontal rotation shaft 11 with respect to the base unit 3, i.e., a rotation angle of the frame unit 5 is detected by the horizontal angle detector 14.

Further, a detection result (a horizontal angle) of the horizontal angle detector 14 is input to a control arithmetic unit 15 (to be described later), and the control arithmetic unit 15 controls a driving of the horizontal drive motor 12 based on the detection result of the horizontal angle detector 14.

A recessed portion 16 is formed in a central portion of the frame unit 5, and rooms 5a and 5b are formed so that the rooms 5a and 5b horizontally sandwich the recessed portion 16 therebetween. A vertical driving unit 17 and a vertical angle detector 18 are accommodated in one room 5a (a left room in the drawing), and a distance measuring light emitting unit 19, a common optical path unit 21, a distance measuring unit 22, an image pickup unit 23, or the like are accommodated in the other room 5b (a right room in the drawing). Further, at a necessary position of an inside of the frame unit 5, the control arithmetic unit 15 is accommodated. Further, on necessary portions of the frame unit 5, a display unit 25 and an operation unit 26 are provided.

The vertical rotation shaft 6 has an axis which extends horizontally, and is rotatably supported on the frame unit 5 via a bearing 27. One end portion of the vertical rotation shaft 6 protrudes into the recessed portion 16, and the scanning mirror 7 is provided at a protrusion end of the vertical rotation shaft 6 in such a manner that the scanning mirror 7 tilts 45° with respect to the axis of the vertical rotation shaft 6. The scanning mirror 7 is supported in the recessed portion 16 by the vertical rotation shaft 6, and is able to freely rotate around the vertical rotation shaft 6 as the center in the vertical direction.

The axis of the vertical rotation shaft 6 is arranged so as to pass through a center of the scanning mirror 7 and coincide with a distance measuring optical axis 36 which enters the scanning mirror 7. Further, the axis of the vertical rotation shaft 6 is set so as to become orthogonal to an axis of the horizontal rotation shaft 11 at the center of the scanning mirror 7.

The vertical driving unit 17 has a vertical drive motor 28, and the vertical rotation shaft 6 is adapted to be rotated by the vertical drive motor 28. The scanning mirror 7 is rotated by the vertical drive motor 28 via the vertical rotation shaft 6. It is to be noted that the vertical rotation shaft 6, the scanning mirror 7, the vertical drive motor 28, or the like make up a scanning unit 29.

The vertical angle detector 18 (e.g., an incremental encoder) is provided to the vertical rotation shaft 6. A rotation angle of the vertical rotation shaft 6 with respect to the frame unit 5 is detected by the vertical angle detector 18. A detection result (a vertical angle) of the vertical angle detector 18 is input to the control arithmetic unit 15, and the control arithmetic unit 15 controls a driving of the vertical drive motor 28 based on the detection result of the vertical angle detector 18.

A GNSS (Global Navigation Satellite Systems) device 24 is attached on an upper surface of the frame unit 5 via an adapter 30. The adapter 30 can be attached to or detached from the frame unit 5. Therefore, the GNSS device 24 can be also attached to or detached from the frame unit 5. Further, the GNSS device 24 receives a signal from an artificial satellite, performs a signal processing as required and inputs the receiving signal to a global coordinate arithmetic component 53 (to be described later). The global coordinate arithmetic component 53 calculates global coordinates based on the receiving signal.

In a case where the GNSS device 24 is attached on the frame unit 5, a reference position of the GNSS device 24 (a position of the global coordinates determined by the GNSS device 24) and a reference position of the laser scanner 1 (a reference position in a case where a distance measurement and an angle measurement are performed) have a known relation with each other. Further, the GNSS device 24 is set so as to be positioned on the axis of the horizontal rotation shaft 11.

The distance measuring light emitting unit 19 has a distance measuring light emitter 31, an optical path splitting component 32 such as a half mirror or a beam splitter or the like, a light projecting optical component 33 constituted of an objective lens or the like, and a mirror 34. The distance measuring light emitter 31 is, e.g., a semiconductor laser or the like, and emits a pulse laser beam of an infrared light which is an invisible light on a distance measuring optical axis 36 as a distance measuring light 35.

The distance measuring optical axis 36 enters the scanning mirror 7 through the common optical path unit 21 and is deflected by the common optical path unit 21 so as to coincide with the axis of the vertical rotation shaft 6. Further, the distance measuring optical axis 36 is deflected in a perpendicular direction by the scanning mirror 7 so as to be directed toward an object to be measured.

The distance measuring light emitter 31 is controlled by the control arithmetic unit 15 so that a pulsed light is emitted in a state as required, e.g., a light intensity as required, a pulse interval as required, or the like.

The common optical path unit 21 has a first beam splitter 38 and a second beam splitter 39. Further, the distance measuring unit 22 has a light receiving optical component 41 constituted of a condenser lens or the like, an optical path extension component 42, an optical path coupler 43, and a photodetection element 44.

A part of the distance measuring light 35 output from the distance measuring light emitter 31 passes through the optical path splitting component 32 and enters the mirror 34 through the light projecting optical component 33. The distance measuring light 35 is reflected by the mirror 34 and led to the common optical path unit 21. Further, a remaining part of the distance measuring light 35 is reflected by the optical path splitting component 32 as an internal reference light and led to an internal reference optical path 37.

The distance measuring light 35 reflected by the mirror 34 is sequentially reflected by the first beam splitter 38 and the second beam splitter 39. The distance measuring light 35 is led to the scanning mirror 7 after being reflected by the second beam splitter 39. It is to be noted that the distance measuring light 35 passed through the first beam splitter 38 and the second beam splitter 39 is absorbed by an antireflection component (not shown).

It is to be noted that the scanning mirror 7 is a deflecting optical component, and the scanning mirror 7 reflects the distance measuring light 35 which is incident from the horizontal direction at a right angle and reflects a reflected distance measuring light, which enters the scanning mirror 7 toward the second beam splitter 39 in the horizontal direction.

The distance measuring light 35, which is led to the scanning mirror 7 from the common optical path unit 21, is reflected by the scanning mirror 7, and irradiated to an object to be measured (not shown). Further, when the scanning mirror 7 is rotated around the vertical rotation shaft 6 as the center, the distance measuring light 35 is rotatably irradiated within a vertical plane. Further, when the horizontal rotary unit 4 rotates the frame unit 5 in the horizontal direction, the distance measuring light 35 is rotatably irradiated around the horizontal rotation shaft 11 as the center in the horizontal direction. Therefore, due to a cooperation of a rotation of the scanning mirror 7 in the vertical direction and a rotation of the frame unit 5 in the horizontal direction, an entire measurement range can be scanned by the distance measuring light 35.

The reflected distance measuring light reflected at the object to be measured which exists within the measurement range enters the scanning mirror 7, is reflected by the scanning mirror 7 and enters the common optical path unit 21. The reflected distance measuring light is reflected by the second beam splitter 39, further passes through the first beam splitter 38 and is led to the distance measuring unit 22.

The distance measuring unit 22 leads the reflected distance measuring light passed through the first beam splitter 38 to the photodetection element 44. Further, the distance measuring unit 22 is configured to lead the internal reference light led by the internal reference optical path 37 to the photodetection element 44 via the optical path coupler 43.

The reflected distance measuring light passed through the first beam splitter 38 enters the light receiving optical component 41, is condensed by the light receiving optical component 41 and enters the optical path extension component 42. The reflected distance measuring light as passed through the optical path extension component 42 is received by the photodetection element 44 via the optical path coupler 43. Further, the internal reference light as passed through the internal reference optical path 37 is received by the photodetection element 44 via the optical path coupler 43.

In the photodetection element 44, the reflected distance measuring light and the internal reference light are converted into a reflected distance measuring light electric signal and an internal reference light electric signal, and transmitted to the control arithmetic unit 15. It is so arranged that based on a time interval difference between the reflected distance measuring light electric signal and the internal reference electric signal, the control arithmetic unit 15 determines a distance to the object to be measured (a measuring point).

The control arithmetic unit 15 calculates a three-dimensional coordinate value of the measuring point based on the distance as measured to the measuring point, the vertical angle detected by the vertical angle detector 18, and the horizontal angle detected by the horizontal angle detector 14. Further, by recording a coordinate value of the measuring point for each pulse, the control arithmetic unit 15 can acquire point cloud data with respect to the entire measurement range or with respect to the objected to be measured. Further, the global coordinates of the laser scanner 1 are calculated based on the receiving signal from the GNSS device 24, and global coordinates of the point cloud data is calculated based on the global coordinates.

The horizontal angle detector 14 and the vertical angle detector 18 make up a directional angle detecting unit which detects a direction of the distance measuring optical axis 36.

The image pickup unit 23 has an image pickup optical axis, and the image pickup optical axis coincides with the distance measuring optical axis 36 via the common optical path unit 21 and enters the scanning mirror 7. An image pickup element 45 is provided at an image forming position on the image pickup optical axis, and the image pickup element 45 is configured to output a digital image signal.

The image pickup element 45 is constituted of an aggregate of pixels, e.g., a CCD or a CMOS sensor or the like, and a position of each pixel in the image pickup element 45 can be specified. In the image pickup element 45, a background light which enters the scanning mirror 7, is reflected by the scanning mirror 7 and passes through the second beam splitter 39 is received.

Further, in a case where an image is acquired by the image pickup unit 23, a vertical angle of the scanning mirror 7 and a horizontal angle of the frame unit 5 are controlled by the control arithmetic unit 15 so that the image pickup optical axis is directed toward an object to be photographed. In this case, the rotation of the scanning mirror 7 and the rotation of the frame unit 5 are stopped or substantially stopped. Further, a distance measurement by the distance measuring unit 22 is stopped, and a light emission of the distance measuring light emitter 31 is also stopped.

Next, by referring to FIG. 2, a description will be given on a control system of the laser scanner 1.

The operation unit 26, the vertical angle detector 18, and the horizontal angle detector 14 are electrically connected to the control arithmetic unit 15. Angle detection signals from the vertical angle detector 18 and the horizontal angle detector 14 are input to the control arithmetic unit 15, and a signal from the operation unit 26 is also input to the control arithmetic unit 15 by an operation of an operator.

The operator can perform setting conditions required to start the measurement of the laser scanner 1 from the operation unit 26, e.g., a setting of a measurement range, a setting of a point cloud data density (a pitch), a setting of an image pickup condition at a time of photographing, or the like, and further can input an instruction to start a detection processing of the number of resonant rotations, a command to start a measurement (to be described later), and the like. The setting conditions and the like input from the operation unit 26 can be confirmed on the display unit 25. It is to be noted that the operation unit 26 and the display unit 25 may be provided on the frame unit 5, or may be additionally independently provided, and may be remotely operatable via a signal transmission medium such as a wireless means or an infrared light.

The control arithmetic unit 15 drives the distance measuring light emitter 31, the horizontal drive motor 12 and the vertical drive motor 28, and also controls the display unit 25 for displaying an operating condition, a measurement result, or the like. Further, on the control arithmetic unit 15, an external storage device 46 such as an HDD, a memory card, a USB memory, or the like is provided. The external storage device 46 may be fixedly provided or detachably provided to the control arithmetic unit 15.

Next, a description will be given on general features of the control arithmetic unit 15.

The control arithmetic unit 15 has an arithmetic unit 47 as respected by a CPU, a storage component 48, a distance measuring light emission driving component 49 for controlling a light emission of the distance measuring light emitter 31, the horizontal driving unit 13 for driving and controlling the horizontal drive motor 12 and the vertical driving unit 17 for driving and controlling the vertical drive motor 28. Further, the control arithmetic unit 15 has a distance data processing component 51 for calculating distance data based on a signal acquired by the distance measuring unit 22, an image data processing component 52 for processing image data acquired by the image pickup unit 23, a global coordinate arithmetic component 53 for calculating a global coordinates based on a receiving signal acquired by the GNSS device 24, and the like.

As described above, the control arithmetic unit 15 controls the horizontal driving unit 13, the vertical driving unit 17, and the like and also executes a calculation and a processing as required by various types of programs (as described later) as a data processing device.

The storage component 48 stores the programs, such as a sequence program configured to perform the distance measurement, the measurement of a vertical angle and the measurement of a horizontal angle, a point cloud data measurement program configured to rotatably irradiate the distance measuring light, further perform the calculation for the distance measurement and the angle measurement, or the like and acquire the point cloud data, a target scanning program configured to scan a target and execute a position measurement of the target, a registration program configured to perform a shape matching of a plurality of point cloud data and perform a combination processing with each point cloud data, an image pickup program configured to control image pickup states of the image pickup unit 23, an image processing program configured to execute an image processing, an image display program configured to display data on the display unit 25, and the like, or a program configured to integrally manage these programs, and the like.

Further, the storage component 48 stores data such as target measurement data, the point cloud data, angle measurement data, the image data, GNSS data, and the like.

It is to be noted that functions of the distance data processing component 51, the image data processing component 52 and the global coordinate arithmetic component 53 may be executed by the arithmetic unit 47. In this case, the distance data processing component 51, the image data processing component 52 and the global coordinate arithmetic component 53 can be omitted.

Further, the distance data processing component 51, the image data processing component 52 and the global coordinate arithmetic component 53 may be separately provided. For instance, a data processing device (e.g., a PC) may be additionally provided, and the PC may execute the functions of the distance data processing component 51, the image data processing component 52 and the global coordinate arithmetic component 53. In this case, a communication means may be provided to each of the laser scanner 1 and the PC, the target measurement data, the point cloud data, the angle measurement data, the image data and the GNSS data may be transmitted to the PC, and the PC may execute a target measurement data processing, a point cloud data processing, an angle measurement data processing, an image data processing and a GNSS data processing. It is to be noted that, as the communication means, the communicating means as required, e.g., an optical communication, a wireless communication, an LAN, or the like can be adopted.

Alternatively, the external storage device 46 may be attachable to or detachable from the laser scanner 1 and the PC in common, the laser scanner 1 may store the data such as the target measurement data, the point cloud data, the angle measurement data, the image data, the GNSS data, and the like in the external storage device 46, and the data stored in the external storage device 46 may be processed by the PC. Further, the shape matching of the point cloud data and a combination (a registration) of the point cloud data may be carried out by the PC.

It is to be noted that although the image pickup unit 23 and the distance measuring unit 22 are integrally provided in the laser scanner 1, the distance measuring unit 22 may be separated and independently provided. In this case, an optical axis of the image pickup unit 23 is set in a known relation with an optical axis of the distance measuring unit 22.

Figure 4:
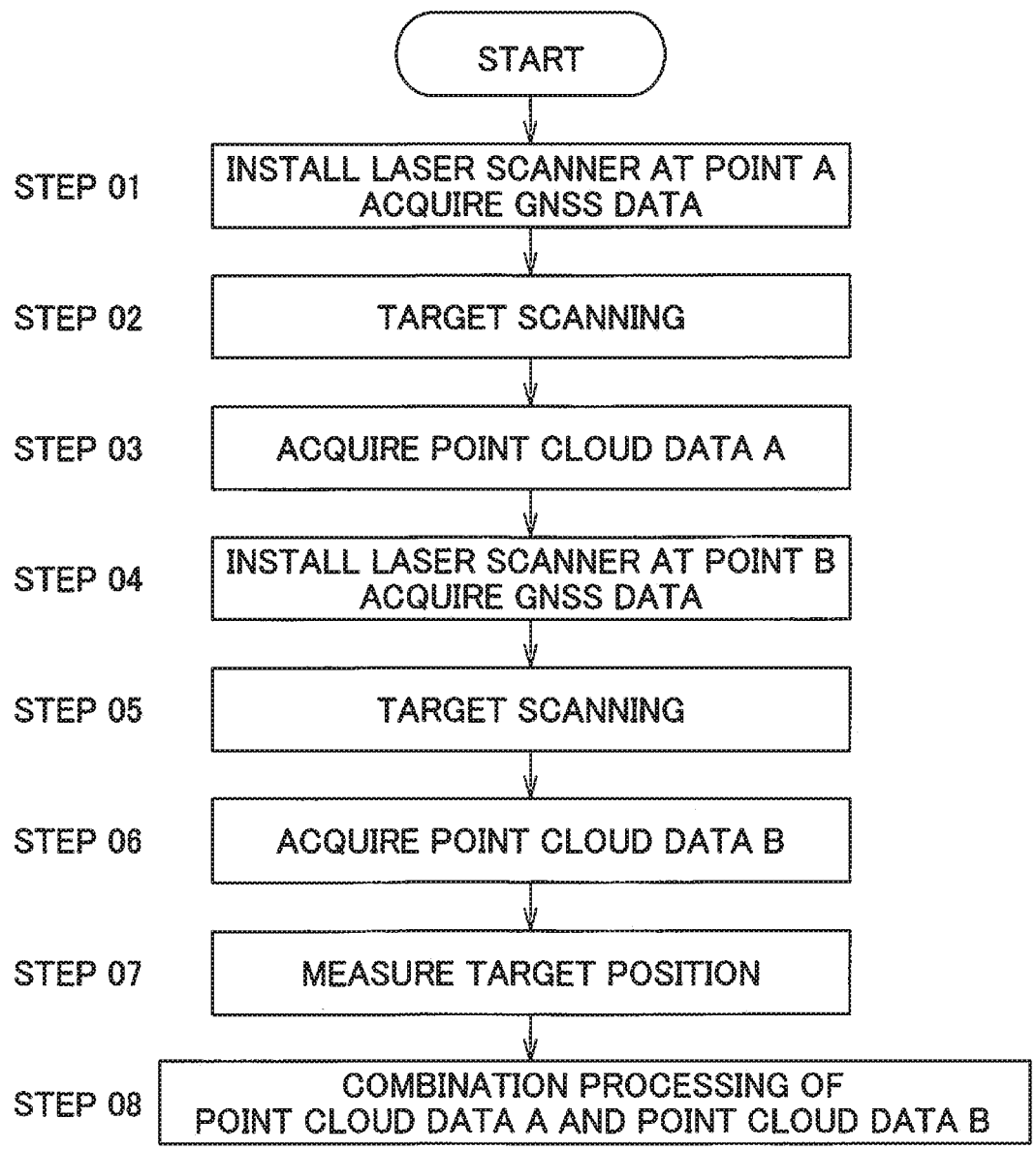
FIG. 4 is a flowchart of the present embodiment.

Next, by referring to FIG. 3 and FIG. 4, a description will be given on a laser scanner system.

The laser scanner system has at least one laser scanner 1 and at least one target 55.

The laser scanner 1 is installed at a position which is suitable for scanning the object to be measured (not shown). In FIG. 3, although two laser scanners 1 are shown, the laser scanner 1 is actually installed at a point A, and then installed at a point B after the measurement as required is completed. Further, although the targets 55 are installed at two positions, the target 55 may be actually installed at one position.

The laser scanner 1 is installed at the point A, and the target 55 as a back sight point is installed at a position (an arbitrary position) a necessary distance away from the point A and the point B in a necessary directions.

In a state where the laser scanner 1 is installed at the point A, the GNSS device 24 is attached to the laser scanner 1.

(Step 01) When the laser scanner 1 is installed at the point A and an installation of the laser scanner 1 at the point A is determined, an installation position of the laser scanner 1 is determined by the GNSS device 24, and global coordinates of the laser scanner 1 are obtained. Here, an operation such as a measurement of an instrument height of the laser scanner 1, or the like is omitted.

(Step 02) The frame unit 5 of the laser scanner 1 is directed toward the target 55 (a horizontal angle is aligned to a direction of the target 55), and the scanning mirror 7 is also directed toward the target 55 (a vertical angle is aligned to the direction of the target 55).

A picture of the target 55 is acquired by the image pickup unit 23. The picture of the target 55 is displayed on the display unit 25. It is confirmed from an image that the distance measuring optical axis 36 is directed toward the target 55.

When the target 55 is confirmed from the image, a target scanning mode is selected by the operation unit 26. The control arithmetic unit 15 executes a target scanning program.

A target scanning range including the target 55 is automatically set, and a target scanning is started. The scan mirror 7 reciprocally rotates at a predetermined rotation angle, the frame unit 5 reciprocally rotates at a predetermined rotation angle, the target scanning range is intensively scanned, and the point cloud data is acquired. A three-dimensional coordinate value of a central position of the target 55 is obtained from the point cloud data as acquired. It is to be noted that the scanning mirror 7 may be configured to rotate over a total circumference.

This three-dimensional coordinate value of the target central position is a coordinate value obtained with reference to the laser scanner 1.

(Step 03) Next, a point cloud data measurement mode is selected, and the point cloud data measurement program is executed by the control arithmetic unit 15. The measurement range including the object to be measured is scanned from the point A, and the point cloud data A is acquired. It is to be noted that, when an upper side is not included in the measurement range, the GNSS device 24 need not to be removed. In a case where point cloud data of the upper side of, e.g., a tunnel, or the like is required, the GNSS device 24 is removed.

(Step 04) When an acquisition of the point cloud data at the point A is finished, the laser scanner 1 is moved to the point B. When the installation of the laser scanner 1 at the point B is determined, the measurement of an installation position of the laser scanner 1 is carried out by the GNSS device 24, and the global coordinates of the laser scanner 1 are obtained.

(Step 05) The distance measuring optical axis 36 is directed toward the target 55, and it is confirmed from an image that the distance measuring optical axis 36 is directed toward the target 55. The target scanning mode is selected by the operation unit 26, and the target scanning is executed as described above.

Based on the point cloud data acquired by the target scanning, the three-dimensional coordinate value of the central position of the target 55 is obtained with reference to the laser scanner 1.

(Step 06) The point cloud data measurement mode is selected, a scanning is performed by the laser scanner 1 at the point B, and point cloud data B at the point B is acquired.

(Step 07) Based on a measurement result of the target 55 by the target scanning at the point A (a coordinate value with reference to the laser scanner 1 installed at the point A) and a measurement result of the target 55 by the target scanning at the point B (a coordinate value with reference to the laser scanner 1 installed at the point B), and also based on the global coordinates of the laser scanner 1 at the point A and the point B, global coordinates of the central position of the target 55 are calculated.

(Step 08) The shape matching of the point cloud data A and the point cloud data B is performed. In a case where the shape matching is performed, by giving the global coordinates of the target 55 as an initial value, a rough matching can be performed immediately. As a result, a shape matching process can be extremely simplified.

The point cloud data A and the point cloud data B are combined (registered) with each other through the shape matching process.

In this embodiment, since the installation position (the global coordinate value) of the laser scanner 1 can be obtained by the GNSS device 24 by itself, it would suffice if the installation position of the laser scanner 1 is arbitrary, only a measurement environment is considered even in a case where the laser scanner 1 is installed at a plurality of positions. As a result, a restriction of the installation can be extremely reduced.

Further, in case of installing the target 55, the target 55 may be installed at an arbitrary point. Therefore, a measurement operation by the laser scanner 1 can be efficiently performed.

The invention claimed is:

1. A laser scanner system comprising:
a laser scanner which includes a distance measuring unit for emitting a distance measuring light, receiving a reflected light from an object to be measured, and performing a distance measurement, a scanning unit for rotatably irradiating said distance measuring light, a directional angle detecting unit for detecting an irradiating direction of said distance measuring light, a GNSS device and a control arithmetic unit, a data processing device and a target which sets a back sight point, wherein said control arithmetic unit has a target scanning mode in which a target scanning range is set so as to include said target and said target scanning range is intensively scanned, and a point cloud data measurement mode in which said distance measuring light is scanned to a measurement range and point cloud data is acquired, and wherein said control arithmetic unit is configured to obtain global coordinate values of an installation position of said laser scanner from said GNSS device at a plurality of installation points of said laser scanner respectively, to acquire point cloud data by executing said point cloud data measurement mode at said plurality of installation points respectively, to determine a target central position by executing said target scanning mode at said plurality of installation points respectively,
to obtain a global coordinate value of a center of said target based on a measurement result obtained by said target scanning mode and said global coordinate values of said plurality of installation points,
and to combine said plurality of point cloud data with each other by a shape matching based on said global coordinate value of said center of said target as an initial value.

2. The laser scanner system according to claim 1, wherein said data processing device is configured to obtain said global coordinate value of said center of said target based on said global coordinate values at said plurality of installation points and measurement results of said target central positions from said plurality of installation points, and to combine said plurality of point cloud data with each other by the shape matching based on said global coordinate value of said center of said target as the initial value.

3. The laser scanner system according to claim 2, wherein said data processing device is provided on said control arithmetic unit.

4. The laser scanner system according to claim 2, wherein the data processing device is provided separately from said laser scanner.

5. A registration method of point cloud data comprising steps of:
installing a laser scanner having a GNSS device at an arbitrary installation position, installing a target at an arbitrary position, obtaining global coordinate values of said laser scanner at a plurality of points by said GNSS device, setting a target scanning range so as to include said target, determining a target central position by intensively scanning said target scanning range, obtaining a global coordinate value of a center of said target based on said global coordinate values of said laser scanner at said plurality of points and measurement results of said target central position, acquiring point cloud data from said plurality of points, and combining said plurality of point cloud data with each other by a shape matching based on said global coordinate value of said center of said target as an initial value.

\* \* \* \* \*